(12) United States Patent
Lin et al.

(10) Patent No.: US 7,777,703 B2
(45) Date of Patent: Aug. 17, 2010

(54) ILLUMINATING DEVICE AND LUMINANCE SWITCHING DEVICE THEREOF

(75) Inventors: Rong-Tsung Lin, Hsin-Chu (TW); Yi-Sheng Lin, Hsin-Chu (TW)

(73) Assignee: Macroblock, Inc., Hsinchu (TW)

( * ) Notice: Subject to any disclaimer, the term of this patent is extended or adjusted under 35 U.S.C. 154(b) by 875 days.

(21) Appl. No.: 11/652,693

(22) Filed: Jan. 12, 2007

(65) Prior Publication Data
US 2008/0129211 A1    Jun. 5, 2008

(30) Foreign Application Priority Data
Nov. 10, 2006    (TW) .............................. 95141807 A

(51) Int. Cl.
G09G 3/32    (2006.01)
(52) U.S. Cl. .................. 345/82; 345/102; 250/205; 315/151
(58) Field of Classification Search .................. 345/82, 345/102; 250/205; 315/151
See application file for complete search history.

(56) References Cited

U.S. PATENT DOCUMENTS

| | | | |
|---|---|---|---|
| 6,344,641 B1 | 2/2002 | Blalock et al. | |
| 6,608,614 B1 | 8/2003 | Johnson | |
| 2004/0196225 A1* | 10/2004 | Shimada | 345/82 |
| 2006/0061300 A1 | 3/2006 | Biebl et al. | |
| 2006/0256049 A1* | 11/2006 | Schou | 345/82 |

* cited by examiner

*Primary Examiner*—Richard Hjerpe
*Assistant Examiner*—Saifeldin Elnafia
(74) *Attorney, Agent, or Firm*—Birch, Stewart, Kolasch & Birch, LLP

(57) ABSTRACT

An illuminating device and a luminance switching device thereof for controlling luminance of light emitting states of LED light source are provided. The luminance switching device includes a changeover switch which is electrically connected to the luminance switching device for switching the light-emitting states of the LED light source and has switching modes corresponding to the light-emitting states, a detecting circuit for detecting the switching mode corresponding to the changeover switch, a memory unit for storing luminance values of the LED light source corresponding to the switching modes detected by the detecting circuit, converting the luminance values of the LED light source into a luminance control signal, and transmitting the luminance control signal to the detecting circuit, and a power conversion circuit for receiving the luminance control signal transmitted from the detecting circuit, such that the LED light source produces luminance of the light-emitting states corresponding to the switching modes.

32 Claims, 3 Drawing Sheets

ILLUMINATING DEVICE AND LUMINANCE SWITCHING DEVICE THEREOF

CROSS-REFERENCE TO RELATED APPLICATIONS

This non-provisional application claims priority under 35 U.S.C. §119(a) on Patent Application No(s). 095141807 filed in Taiwan, R.O.C. on Nov. 10, 2006, the entire contents of which are hereby incorporated by reference.

BACKGROUND OF THE INVENTION

1. Field of Invention

The present invention relates to an illuminating device and a luminance switching device thereof, and more particularly to a luminance switching device with a built-in memory unit for providing a multi-stage switching of various illuminating devices.

2. Related Art

In recent years, light emitting diodes (LEDs) has been widely used in daily life, for example, in monitors, home appliances, electronic components for vehicles, and lighting lamps. Taking domestic lighting lamps as an example, a conventional domestic lighting lamp usually has a plurality of bulbs, and when a user wants to change the luminance state of the environment, a changeover switch is used to sequentially switch the plurality of bulbs in multiple stages according to a set value, so as to turn off the bulbs. For example, when the changeover switch is just turned on, all of the bulbs are in a turn-on state. When the changeover switch is turned off and then turned on again, at least one bulb is in a turn-off state, which results in the weakening of luminance of the light emitted by the entire lighting lamp. When the changeover switch is turned off and then turned on again, at least one bulb that is in the turn-on state in the previous stage assumes the turn-off state. Thus, the luminance of the lighting lamp can be switched in multiple stages. However, when the bulbs of the lighting lamp are replaced by LEDs, as the unit number of LEDs required in the bulbs is large, the luminance of the light emitted from the entire lighting lamp will be uneven if the LEDs of the lighting lamp are turned off sequentially according to the operating mode described above.

In order to solve the aforementioned problem of uneven luminance of the devices using the LEDs as the light sources, U.S. Pat. No. 6,344,641 has disclosed a control method of a display system using LEDs as a light source. FIG. 1 is a schematic view of a conventional display system. Referring to FIG. 1, the conventional display system 10 includes two LEDs 12A, 12B, a display device 14, and a luminance detecting and control circuit 20 disposed in the display device 14. The display device 14 includes an image display array 18 to display images of the display device 14. In addition, the display device 14 further includes a controller 22 electrically connected to the luminance detecting and control circuit 20, for transmitting a timing and control signal to the luminance detecting and control circuit 20. The two photo-detectors 16A and 16B are aligned with the LEDs 12A and 12B, and are electrically connected to the luminance detecting and control circuit 20 for detecting luminance of the light emitted by the LEDs 12A and 12B respectively.

When the photo-detectors 16A and 16B detect the luminance of the light emitted by the LEDs 12A and 12B respectively, the detected luminance of the light is converted into a current signal, which is then transmitted to the luminance detecting and control circuit 20. At this time, if the luminance of the LEDs 12A and 12B needs to be changed, the controller 22 will output a modulation signal to the luminance detecting and control circuit 20 according to requirements of the user. Then, the luminance detecting and control circuit 20 integrates the signals from the photo-detectors 16A and 16B and the controller 22, and sends a voltage signal to modulate the luminance to be adjusted of the LEDs 12A and 12B respectively. Thus, the luminance control of the light emitted from the LEDs 12A and 12B of the display device 14 is realized.

However, though the luminance detecting and control circuit 20 controls the luminance of the light emitted by the LEDs 12A and 12B individually, the compensation can only be performed according to the insufficient luminance of the LEDs 12A, 12B detected by the photo-detectors 16A, 16B or the luminance to be adjusted. If the user wants to individually adjust the luminance of the light emitted by the LEDs 12A, 12B to luminance of different states, such that the display device 14 uses the LEDs 12A, 12B to show different brightness. As the photo-detectors 16A and 16B are influenced by the light emitted by the neighboring LEDs 12A, 12B, for example, the photo-detector 16A also detects the light emitted by the LED 12B, the object to control the LEDs 12A, 12B to emit light of different luminance cannot be achieved. Moreover, when the display device 14 uses a large number of LEDs, the luminance detecting and control circuit 20 cannot control the light of different luminance emitted by the LEDs in a specific state at the specific state again while prevent the problem of uneven luminance at the same time.

SUMMARY OF THE INVENTION

In view of the aforementioned problems, the object of the present invention is to provide a luminance switching device for switching luminance of a plurality of light emitting states produced by an LED light source composed of at least one LED. The luminance switching device includes a changeover switch electrically connected to the luminance switching device, for switching the light emitting states of the LEDs, wherein the changeover switch has a plurality of switching modes corresponding to the light emitting states; a detecting circuit electrically connected to the changeover switch, for detecting the switching modes of the changeover switch; a memory unit electrically connected to the detecting circuit, for storing luminance values of the LEDs corresponding to the switching modes of the changeover switch detected by the detecting circuit, converting the luminance values of the LEDs to a luminance control signal, and transmitting the luminance control signal to the detecting circuit; and a power conversion circuit, electrically connected to the LED light source, for receiving the luminance control signal transmitted from the detecting circuit, such that the LED light source produces luminance of the light-emitting states corresponding to the switching modes.

Moreover, the present invention also provides an illuminating device, which comprises an LED light source composed of at least one LED, and having a plurality of light emitting states; a changeover switch, for switching the light emitting states of the LED source and having a plurality of switching modes corresponding to the light emitting states; a detecting circuit electrically connected to the changeover switch, for detecting the switching modes of the changeover switch; a memory unit, electrically connected to the detecting circuit, for storing luminance values of the LEDs of the LED light source corresponding to the switching modes of the changeover switch detected by the detecting circuit, converting the luminance values of the LEDs to a luminance control signal, and transmitting the luminance control signal to the detecting circuit; and a power conversion circuit, electrically connected to the LED light source, for receiving the luminance control signal transmitted from the detecting circuit, such that the LEDs produce luminance of the light-emitting states corresponding to the switching modes.

The illuminating device and the luminance switching device of the present invention both include a built-in memory unit, for storing the luminance value of the light emitted by each of the LEDs in each setting state. Therefore, each time after the changeover switch is switched, the LEDs will present the luminance value of the emitted light, and will not have the problem of uneven light that is caused by the influence of the light emitted from neighboring LEDs. Thus, the multi-stage switching of the luminance of the LED light source is provided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1:
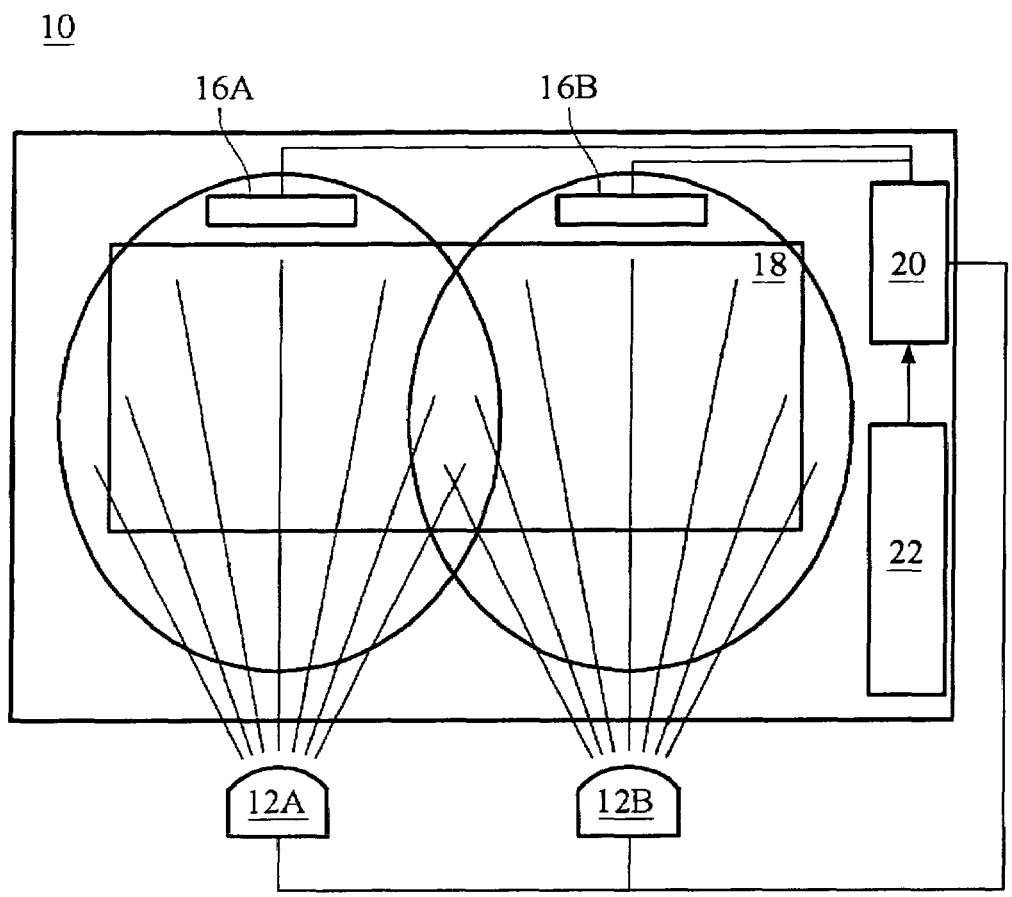
FIG. 1 is a schematic view of a conventional display system.
Figure 2A:
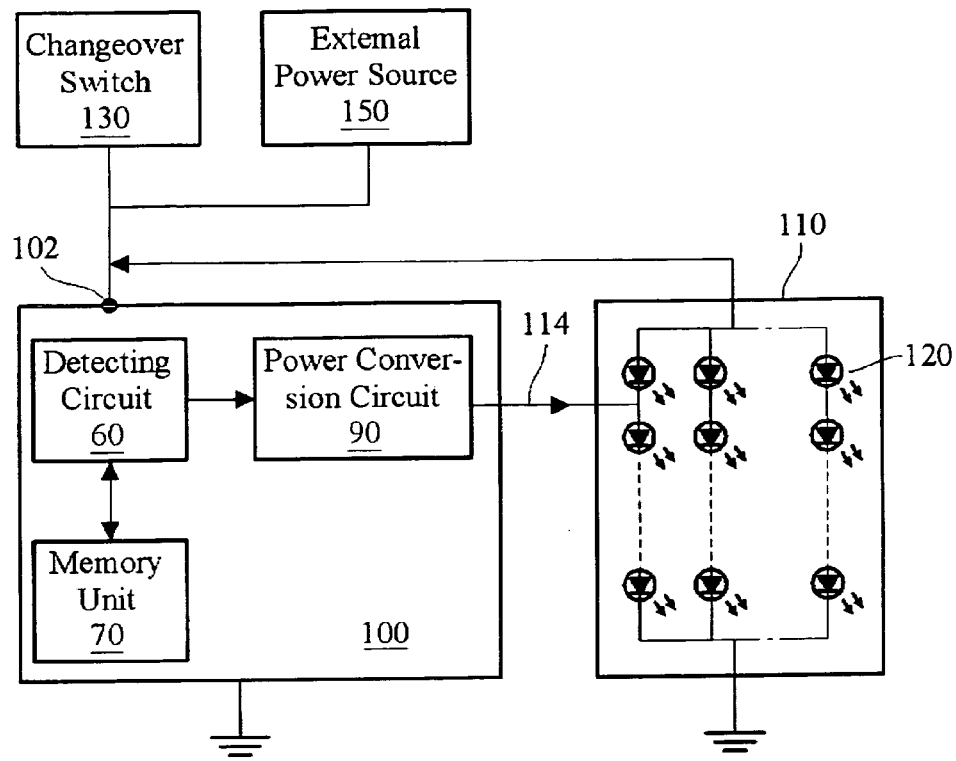
FIG. 2A is a block diagram of functions of the illuminating device and the luminance switching device thereof according to the present invention.

FIG. 2A is a block diagram of functions of the illuminating device and the luminance switching device thereof according to the present invention. Referring to FIG. 2A, the illuminating device of the present invention includes an LED light source 110 and a luminance switching device 100. The LED light source is composed of at least one light emitting diode (LED) 120, and the luminance switching device 100 is used for switching the luminance of a plurality of light emitting states produced by each of the LEDs 120 of the LED light source 110. The luminance switching device 100 includes a changeover switch 130, a detecting circuit 60, a memory unit 70, and a power conversion circuit 90. Moreover, the LEDs 120 of the LED light source 110 can be connected in series, in parallel, or in series and parallel, so as to form some special patterns.

The changeover switch 130 is electrically connected to the detecting circuit 60 of the luminance switching device 100, so as to switch the plurality of light emitting states produced by the LEDs 120 of the LED light source 110. Moreover, the changeover switch 130 has a plurality of switching modes corresponding to the light emitting states.

The detecting circuit 60 is electrically connected to the changeover switch 130, for detecting the corresponding switching modes of the changeover switch 130. The memory unit 70 is electrically connected to the detecting circuit 60, for storing a luminance value of light emitted by each of the LEDs 120 corresponding to a certain switching mode of the changeover switch 130 detected by the detecting circuit 60, and converting the luminance value of each of the LEDs 120 into a luminance control signal.

In this embodiment, the power conversion circuit 90 is an alternate current (AC)/direct current (DC) converter, which is electrically connected between the detecting circuit 60 and the LED light source 110, for transmitting the luminance control signal from the detecting circuit 60 to the LED light source 110, and converts the AC power input to the luminance switching device 100 of the light source by an external power source 150 into a DC power that can be received and used by the luminance switching device 100 and the LED light source 110. Furthermore, the power conversion circuit 90 of the present invention can also be a DC/DC converter. At this time, the external power source 150 is a DC power source, for providing power to the luminance switching device 100 and the LED light source 110.

Figure 2B:
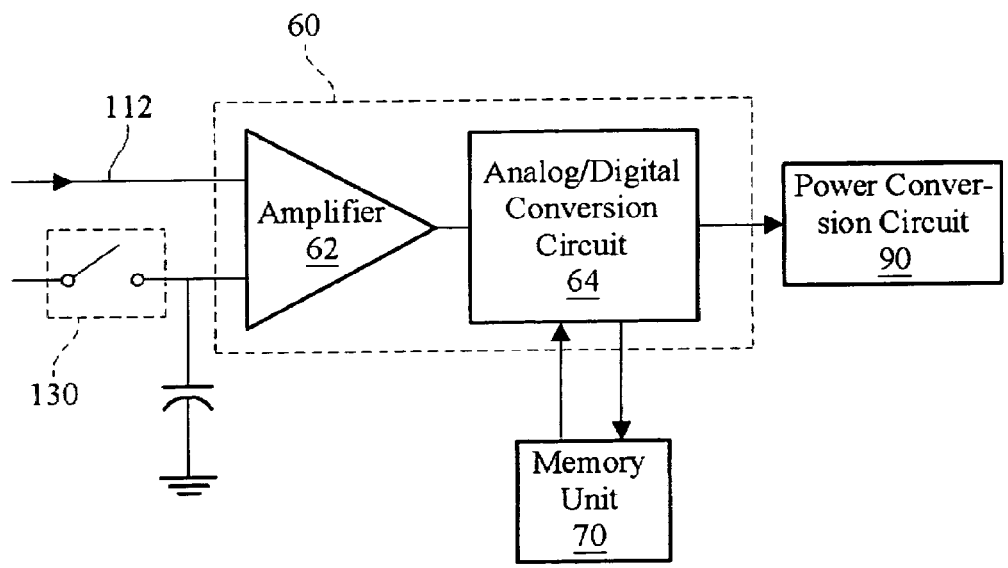
FIG. 2B is a simplified circuit diagram of the detecting circuit of FIG. 2A.

FIG. 2B is a simplified circuit diagram of the detecting circuit 60 of FIG. 2A. Referring to FIG. 2A, the detecting circuit 60 of the present invention includes an amplifier 62 and an analog/digital conversion circuit 64. A forward input end of the amplifier 62 is used for receiving the luminance signal e.g. a current signal of each of the LEDs 120 in the LED light source 110, and a backward input end of the amplifier 62 is electrically connected to the changeover switch 130. The analog/digital conversion circuit 64 is electrically between the amplifier 62 and the memory unit 70, for converting an analog control signal transmitted from the amplifier 62 and the memory unit 70 into a digital control signal, and transmitting the digital control signal to the power conversion circuit 90. The power conversion circuit 90 then converts the digital control signal into a luminance control signal, which is used to control the luminance of the light emitted by each of the LEDs 120 in the LED light source 110.

The luminance switching device 100 according to the present invention can adjust the luminance value of the light emitted by each of the LEDs 120 in the LED light source 110 precisely, and the operating principle is described as follows. Referring to FIGS. 2A and 2B again, when the changeover switch 130 is OFF, the luminance switching device 100 detects the luminance of the light emitted by each of the LEDs 120 in the LED light source 110, and a luminance signal 112 is input to the forward input end of the detecting circuit 60 via a signal feed-in end 102 of the luminance switching device 100. The luminance signal 112 can be a current signal, which carries the luminance value of the light emitted from each of the LEDs 120 of the LED light source 110. After being amplified by the amplifier 62 of the detecting circuit 60, the luminance signal 112 is then converted into a digital signal by the analog/digital conversion circuit 64 and transmitted to the memory unit 70. At this time, the memory unit 70 stores the luminance state of the light emitted by each of the LEDs 120. When the changeover switch 130 is turned on, the plurality of LEDs 120 in the LED light source 110 assumes the same or different luminance states according to an originally set state (it is assumed that all of the LEDs 120 are in the turn-on state, and the luminance of the light emitted by the LEDs 120 is the same), and the memory unit 70 stores the luminance value of the light emitted by each of the LEDs 120. The luminance state of each of the LEDs 120 stored in the memory unit 70 is converted into an analog signal by a conversion interface (not shown), and the analog signal is transmitted to the analog/digital conversion circuit 64. Then, the control signal of the luminance value of the light emitted by each LED 120 that is required to reach the originally set state is transmitted to the power conversion circuit 90, so as to convert the control signal into a luminance control signal 114 that can be received by the LED light source 110, such that each LED 120 assumes the preset luminance value. The luminance control signal 114 can be a pulse width modulation (PWM) signal, a voltage control signal, or a current control signal.

When the changeover switch 130 is turned off and then is turned on, the luminance switching device 100 controls the luminance value of the light emitted by each LED 120 according to the originally set state. For example, at this time, the luminance of the light emitted by at least one LED 120 is reduced, such that the image presented by the entire LED light source 110 shows different visual effects due to the luminance change of the LEDs 120. As the memory unit 70 of the present invention can store different luminance values that the LEDs 120 will present according to the original setting each time after the changeover switch 130 is turned on, the luminance value that each of the LEDs 120 in the LED light source 110 will present can be controlled, and the problem of uneven light caused by the influence of neighboring LEDs 120 will not occur.

Figure 3:
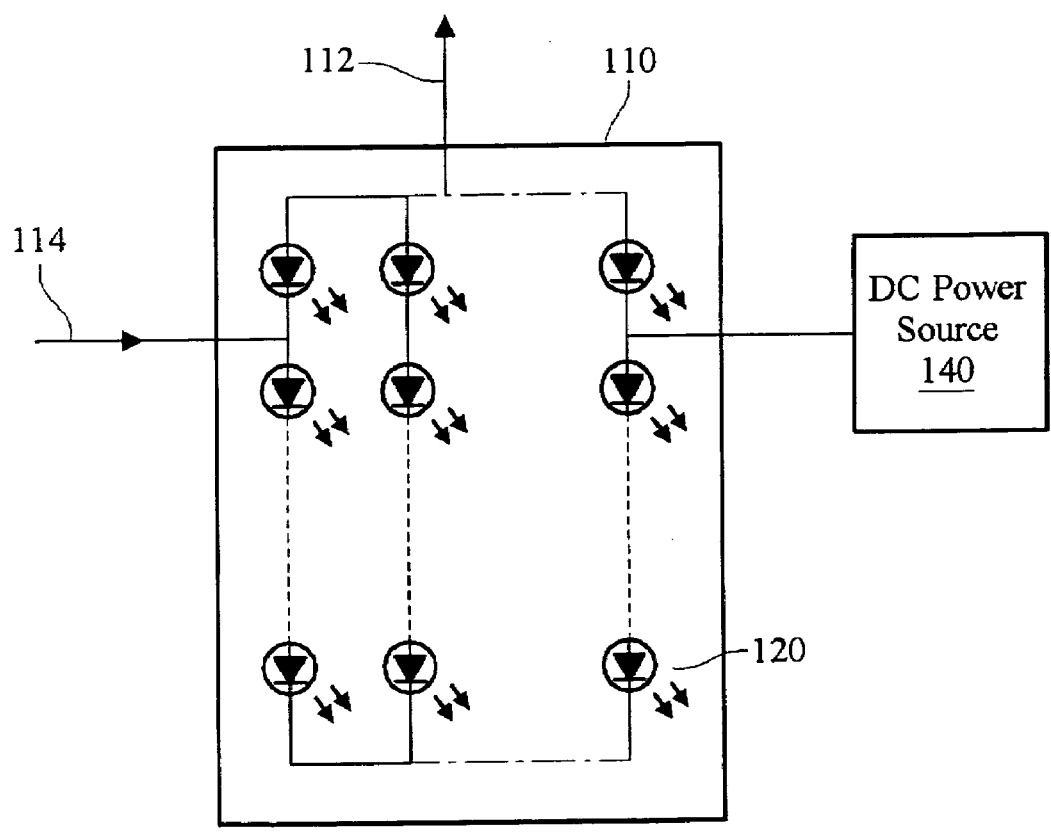
FIG. 3 is a schematic view of another implementation aspect of the LED light source of the present invention.

FIG. 3 is a schematic view of another implementation aspect of the LED light source 110 of the present invention. Referring to FIG. 3, in this embodiment, a DC power source 140 is connected to the LED light source 110 externally, which is used as the power source of the LEDs 120 directly. Other parts of this embodiment are the same as those of the above embodiment, and will not be described herein again.

The changeover switch 130 of the present invention can be a common switch, which provides an external trigger signal to the luminance switching device 100 through a manual switching motion. The external trigger signal can be a continuous pressing signal. A user can press the changeover switch 130 with a hand continuously, with the increase of the time that the user presses and holds the changeover switch, the luminance of the LEDs 120 of the LED light source 110 in the continuous switching mode will increase or reduce accordingly. In addition, the external trigger signal can also be a multi-stage pressing signal. The user can set the changeover switch 130 to a plurality of switching modes according to a preset interval of time. When the user presses the changeover switch 130 continuously by hand, with the increase of the time that the user presses and holds the changeover switch, the luminance of the LEDs 120 of the LED light source 110 in this continuous switching mode will increase in multiple stages or decrease in multiple stages. Moreover, the external trigger signal can also be a multi-stage switching signal. The user can define the switching times of the changeover switch 130 to a plurality of switching modes. When the user switches the changeover switch 130 by hand, the luminance of the LEDs 120 of the LED light source 110 in this switching mode will increase in multiple stages or decrease in multiple stages as well. Furthermore, the changeover switch 130 can also be a programmable circuit used with a computer, so as to realize the multi-stage switching of the LEDs 120 of the LED light source.

It should be noticed that the luminance switching device 100 of the present invention is not only applicable to general LED display devices, but also to multi-stage lighting lamps, decorating lamps with variable colors, lighting lamps with variable colors, and the like, as long as the LED light source is composed of LEDs emitting light of different colors (R, G, and B).

Compared with the conventional art, the illuminating device and the luminance switching device 100 thereof according to the present invention include a built-in memory unit, which stores the luminance value of the light emitted by each of the LEDs in each of the preset switching mode of the changeover switch 130. Therefore, each time after the changeover switch is switched, the LEDs can present the required luminance values of the light, and the problem of uneven light caused by the influence of the light emitted by neighboring LEDs 120 is prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An illuminating device, comprising:
   an LED light source, composed of at least one light-emitting diode (LED), wherein the LED light source has a plurality of light-emitting states;
   a changeover switch, for switching the light-emitting states of the LED light source, wherein the changeover switch has a plurality of switching modes corresponding to the light-emitting states;
   a detecting circuit, directly electrically connected to the changeover switch, for detecting the switching modes of the changeover switch;
   a memory unit, electrically connected to the detecting circuit, for storing luminance values of the LEDs of the LED light source corresponding to the switching modes of the changeover switch detected by the detecting circuit, converting the luminance values of the LEDs into a luminance control signal, and transmitting the luminance control signal to the detecting circuit; and
   a power conversion circuit, directly electrically connected to the LED light source, for receiving the luminance control signal transmitted from the detecting circuit, such that the LEDs produce luminance of the light-emitting states corresponding to the switching modes.

2. The illuminating device as claimed in claim 1, wherein the luminance of at least one LED of the LED light source is different under a different switching mode of the changeover switch.

3. The illuminating device as claimed in claim 1, further comprising an external power source, for providing power to the illuminating device through the switching of the changeover switch.

4. The illuminating device as claimed in claim 1, further comprising a direct current (DC) power source electrically connected to the LED light source, for providing power to the LED light source.

5. The illuminating device as claimed in claim 1, wherein the detecting circuit comprises:
   an amplifier, having a forward input end for receiving the light-emitting states of the LED light source, and having a backward input end electrically connected to the changeover switch for receiving the switching modes of the changeover switch; and
   an analog/digital conversion circuit, electrically connected to the amplifier and the memory unit, for converting an analog control signal transmitted from the amplifier and the memory unit into a digital control signal.

6. The illuminating device as claimed in claim 2, wherein the changeover switch performs the switching modes of the LED light source through an external trigger signal.

7. The illuminating device as claimed in claim 6, wherein the external trigger signal is a continuous pressing signal, the changeover switch is pressed continuously to generate the continuous pressing signal, and the luminance values of the LEDs of the LED light source are in direct or inverse proportion to time when the changeover switch is pressed.

8. The illuminating device as claimed in claim 6, wherein the external trigger signal is a multi-stage switching signal, a switching times of the changeover switch is defined to the switching modes, and the luminance values of the LEDs of the LED light source increase in multiple stages or decreases in multiple stages according to a number of times the switching times that the changeover switch is switched.

9. The illuminating device as claimed in claim 6, wherein the external trigger signal is a multi-stage pressing signal, the changeover switch is pressed continuously to generate the multi-stage pressing signal, a predetermined time interval exists between the switching modes, and the luminance values of the LEDs of the LED light source increase in multiple stages or decreases in multiple stages according to the time when the changeover switch is pressed.

10. The illuminating device as claimed in claim 6, further comprising a signal input end for receiving the external trigger signal.

11. The illuminating device as claimed in claim 1, wherein the changeover switch is a programmable circuit.

12. The illuminating device as claimed in claim 1, wherein the power conversion circuit is an alternate current (AC)/direct current (DC) converter.

13. The illuminating device as claimed in claim 1, wherein the power conversion circuit is a DC/DC converter.

14. The illuminating device as claimed in claim 1, wherein the luminance control signal output from the power conversion circuit is a pulse width modulation (PWM) signal.

15. The illuminating device as claimed in claim 1, wherein the luminance control signal output from the power conversion circuit is a voltage signal.

16. The illuminating device as claimed in claim 1, wherein the luminance control signal output from the power conversion circuit is a current signal.

17. A luminance switching device, for switching luminance of a plurality of light-emitting states produced by a light-emitting diode (LED) light source including at least one LED, the luminance switching device comprising:
   a changeover switch, electrically connected to the luminance switching device, for switching the light-emitting states of the LEDs, wherein the changeover switch has a plurality of switching modes corresponding to the plurality of light-emitting states;
   a detecting circuit, directly electrically connected to the changeover switch, for detecting the switching modes of the changeover switch;
   a memory unit, electrically connected to the detecting circuit, for storing luminance values of the LEDs corresponding to the switching modes of the changeover switch detected by the detecting circuit, converting the luminance values of the LEDs into a luminance control signal, and transmitting the luminance control signal to the detecting circuit; and
   a power conversion circuit, directly electrically connected to the LED light source, for receiving the luminance control signal transmitted from the detecting circuit, such that the LEDs produce luminance of the light-emitting states corresponding to the switching modes.

18. The luminance switching device as claimed in claim 17, wherein the luminance of at least one LED of the LED light source is different under a different switching mode of the changeover switch.

19. The luminance switching device as claimed in claim 17, further comprising an external power source, for providing power to the luminance switching device through the switching of the changeover switch.

20. The luminance switching device as claimed in claim 17, further comprising a direct current (DC) power source electrically connected to the LED light source, for providing power to the LED light source.

21. The luminance switching device as claimed in claim 17, wherein the detecting circuit comprises:
   an amplifier, having a forward input end for receiving the light-emitting states of the LED light source, and a backward input end electrically connected to the changeover switch for receiving the switching modes of the changeover switch; and
   an analog/digital conversion circuit, electrically connected to the amplifier and the memory unit, for converting an analog control signal transmitted from the amplifier and the memory unit into a digital control signal.

22. The luminance switching device as claimed in claim 18, wherein the changeover switch performs the switching modes of the LED light source through an external trigger signal.

23. The luminance switching device as claimed in claim 22, wherein the external trigger signal is a continuous pressing signal, the changeover switch is pressed continuously, and the luminance values of the LEDs of the LED light source are in direct or inverse proportion to time when the changeover switch is pressed.

24. The luminance switching device as claimed in claim 22, wherein the external trigger signal is a multi-stage switching signal, a switching times of the changeover switch is defined to the switching modes, and the luminance values of the LEDs of the LED light source increase in multiple stages or decreases in multiple stages according to a number of the switching times that the changeover switch is switched.

25. The luminance switching device as claimed in claim 22, wherein the external trigger signal is a multi-stage pressing signal, the changeover switch is pressed continuously, a predetermined time interval exists between the switching modes, and the luminance values of the LEDs of the LED light source increase in multiple stages or decreases in multiple stages according to the time when the changeover switch is pressed.

26. The luminance switching device as claimed in claim 22, further comprising a signal input end for receiving the external trigger signal.

27. The luminance switching device as claimed in claim 17, wherein the changeover switch is a programmable circuit.

28. The luminance switching device as claimed in claim 17, wherein the power conversion circuit is an alternate current (AC)/direct current (DC) converter.

29. The luminance switching device as claimed in claim 17, wherein the power conversion circuit is a DC/DC converter.

30. The luminance switching device as claimed in claim 17, wherein the luminance control signal output from the power conversion circuit is a pulse width modulation (PWM) signal.

31. The luminance switching device as claimed in claim 17, wherein the luminance control signal output from the power conversion circuit is a voltage signal.

32. The luminance switching device as claimed in claim 17, wherein the luminance control signal output from the power conversion circuit is a current signal.

* * * * *